United States Patent
Hoffmann et al.

(10) Patent No.: US 8,360,722 B2
(45) Date of Patent: Jan. 29, 2013

(54) METHOD AND SYSTEM FOR VALIDATING WIND TURBINE

(75) Inventors: Till Hoffmann, Osnabrück (DE); Gert Torbohm, Nordrhein-Westfalen (DE); Jignesh Gandhi, Simpsonville, SC (US); Robert Peter Slack, Seattle, WA (US); Kirk Gee Pierce, Lafayette, CO (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/790,130

(22) Filed: May 28, 2010
(Under 37 CFR 1.47)

(65) Prior Publication Data
US 2011/0142593 A1 Jun. 16, 2011

(51) Int. Cl.
*F03D 7/04* (2006.01)
*F03D 11/00* (2006.01)

(52) U.S. Cl. .......... 416/1; 415/118; 415/119; 416/31; 416/61; 416/145; 416/500; 73/455

(58) Field of Classification Search .......... 415/13, 415/14, 118, 119; 416/1, 31, 43, 61, 144, 416/145, 500; 73/455
See application file for complete search history.

(56) References Cited

U.S. PATENT DOCUMENTS

| | | | |
|---|---|---|---|
| 4,738,590 A | 4/1988 | Butler | |
| 5,174,718 A | 12/1992 | Lampeter et al. | |
| 7,118,339 B2 | 10/2006 | Moroz et al. | |
| 7,160,083 B2* | 1/2007 | Pierce et al. | 416/61 |
| 7,415,878 B2* | 8/2008 | Gutknecht | 73/455 |
| 7,437,264 B2 | 10/2008 | Pierce et al. | |
| 2009/0129924 A1* | 5/2009 | Rebsdorf et al. | 416/43 |
| 2009/0129925 A1 | 5/2009 | Vronsky et al. | |
| 2009/0148286 A1 | 6/2009 | Kammer et al. | |
| 2009/0266160 A1 | 10/2009 | Jeffrey et al. | |
| 2009/0306829 A1* | 12/2009 | Hildebrand et al. | 73/455 |

* cited by examiner

*Primary Examiner* — Christopher Verdier

(74) *Attorney, Agent, or Firm* — James McGinness, Esq.; Armstrong Teasdale LLP

(57) ABSTRACT

A method of validating a wind turbine including a rotor includes intentionally inducing a loading imbalance to the rotor. The method also includes measuring the loading imbalance induced to the rotor, transmitting a signal representative of the measured loading imbalance to a calibration module, and at least one of detecting an error and calibrating at least one component of the wind turbine based on the signal.

17 Claims, 5 Drawing Sheets

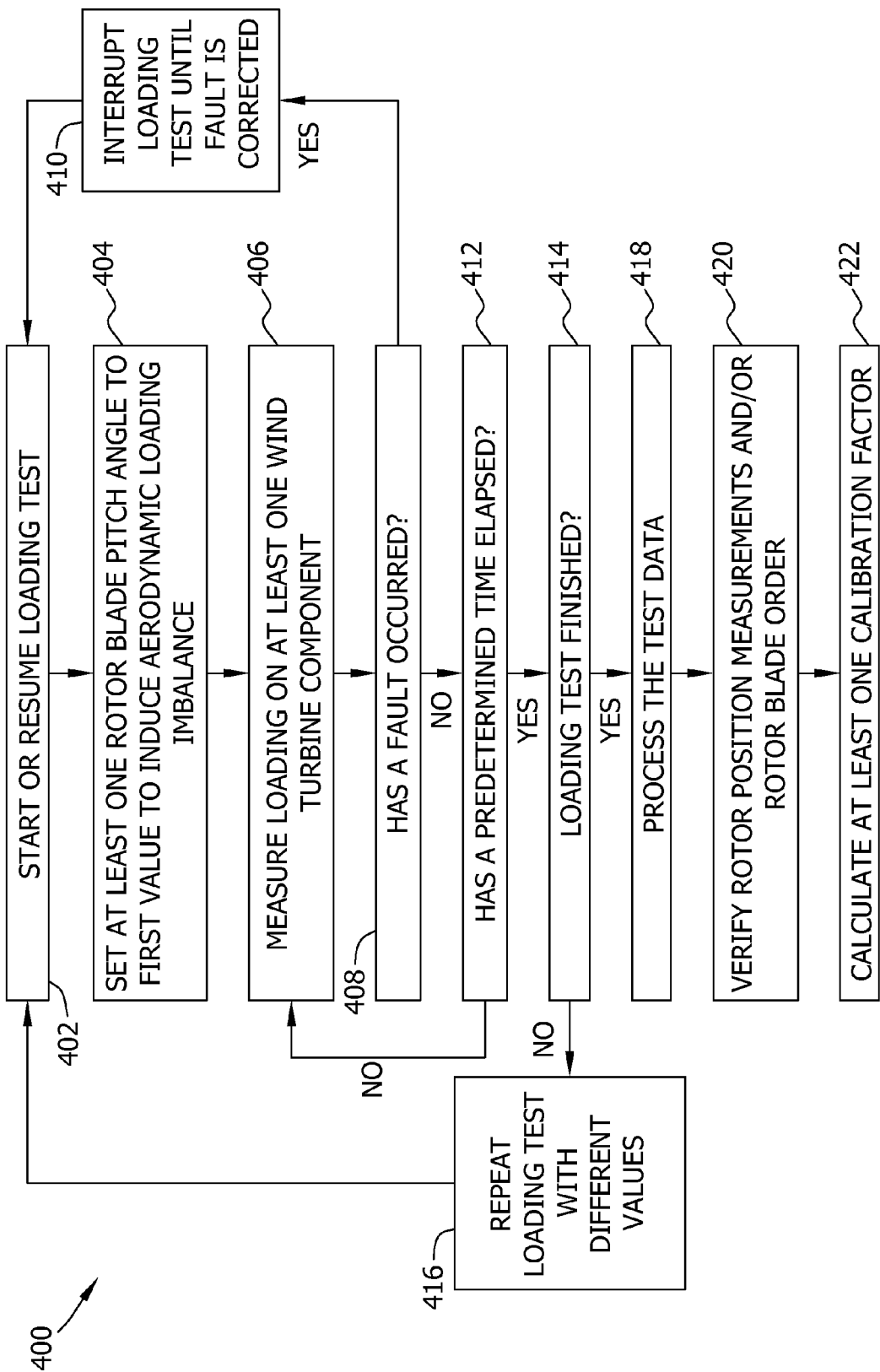

METHOD AND SYSTEM FOR VALIDATING WIND TURBINE

BACKGROUND OF THE INVENTION

The subject matter described herein relates generally to wind turbines and, more particularly, to a method and system for validating a wind turbine.

Generally, a wind turbine includes a rotor that includes a rotatable hub assembly having multiple rotor blades. The rotor blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a tower.

In at least some known wind turbines, one or more errors may occur during installation of one or more wind turbine components. For example, a rotor blade control cabinet may be wired in an atypical order and/or a rotor position sensor may be installed with a wrong zero point reference. Such errors may not be easily detectable, at least in part due to a symmetry of the rotor in known wind turbines. If such errors are not detected, mechanical loads may be substantially increased on one or more wind turbine components with little, if any, visual indication of an abnormal operation of the wind turbine. To detect such errors, at least some known wind turbines include redundant sensors that each measure a rotor position. However, errors may remain undetected in such wind turbines because once a first sensor is erroneously installed, subsequent sensors may also be erroneously installed.

Moreover, at least some known wind turbines balance a loading on one or more wind turbine components using an Asymmetric Load Control (ALC) system. Such ALC systems generally adjust a pitch angle of each rotor blade independently to balance loading induced to the rotor. During operation of the wind turbine, an aerodynamic performance of the rotor blades may change. For example, a leading edge of one or more rotor blades may wear over time, thus changing the rotor blade's aerodynamic performance in response to pitch angles induced to the rotor blade. To measure such changes, the use of expensive test equipment is often required.

BRIEF DESCRIPTION OF THE INVENTION

In one embodiment, a method of validating a wind turbine including a rotor is provided. The method includes intentionally inducing a loading imbalance to the rotor and measuring the loading imbalance induced to the rotor. The method also includes transmitting a signal representative of the measured loading imbalance to a calibration module and at least one of detecting an error and calibrating at least one component of the wind turbine based on the signal.

In another embodiment, a wind turbine is provided that includes a rotor and at least two rotor blades coupled to the rotor. The wind turbine also includes a load control system configured to adjust a pitch angle of at least one rotor blade of the two rotor blades. The load control system is further configured to intentionally induce a loading imbalance to the rotor and to measure the loading imbalance induced to the rotor. The load control system is also configured to transmit a signal representative of the measured loading imbalance to a calibration module and to at least one of detect an error and calibrate at least one component of the wind turbine based on the signal.

In yet another embodiment, a load control system for a wind turbine that includes a rotor is provided. The load control system is configured to intentionally induce a loading imbalance to the rotor. The load control system includes at least one sensor configured to measure the loading imbalance within the rotor and to generate a signal representative of the measured loading imbalance. The load control system also includes a calibration module configured to receive the signal and to at least one of detect an error and calibrate at least one component of the wind turbine based on the signal.

BRIEF DESCRIPTION OF THE DRAWINGS

FIG. 5 is a flow diagram of an exemplary method of validating a wind turbine suitable for use with the wind turbine shown in FIG. 1.

DETAILED DESCRIPTION OF THE INVENTION

The embodiments described herein provide a load control system and a method of validating a wind turbine. The load control system induces aerodynamic imbalances to a rotor and measures the resulting displacements or bending moments induced to the rotor. The load control system uses the measurements to detect a rotor position measurement error and/or an incorrect rotor blade installation or wiring order. The load control system also uses the measurements to calculate a calibration factor for the pitch angles that are induced to the rotor blades. As such, rotor errors may be detected and at least one component of the wind turbine may be calibrated without expensive test equipment.

Figure 1:
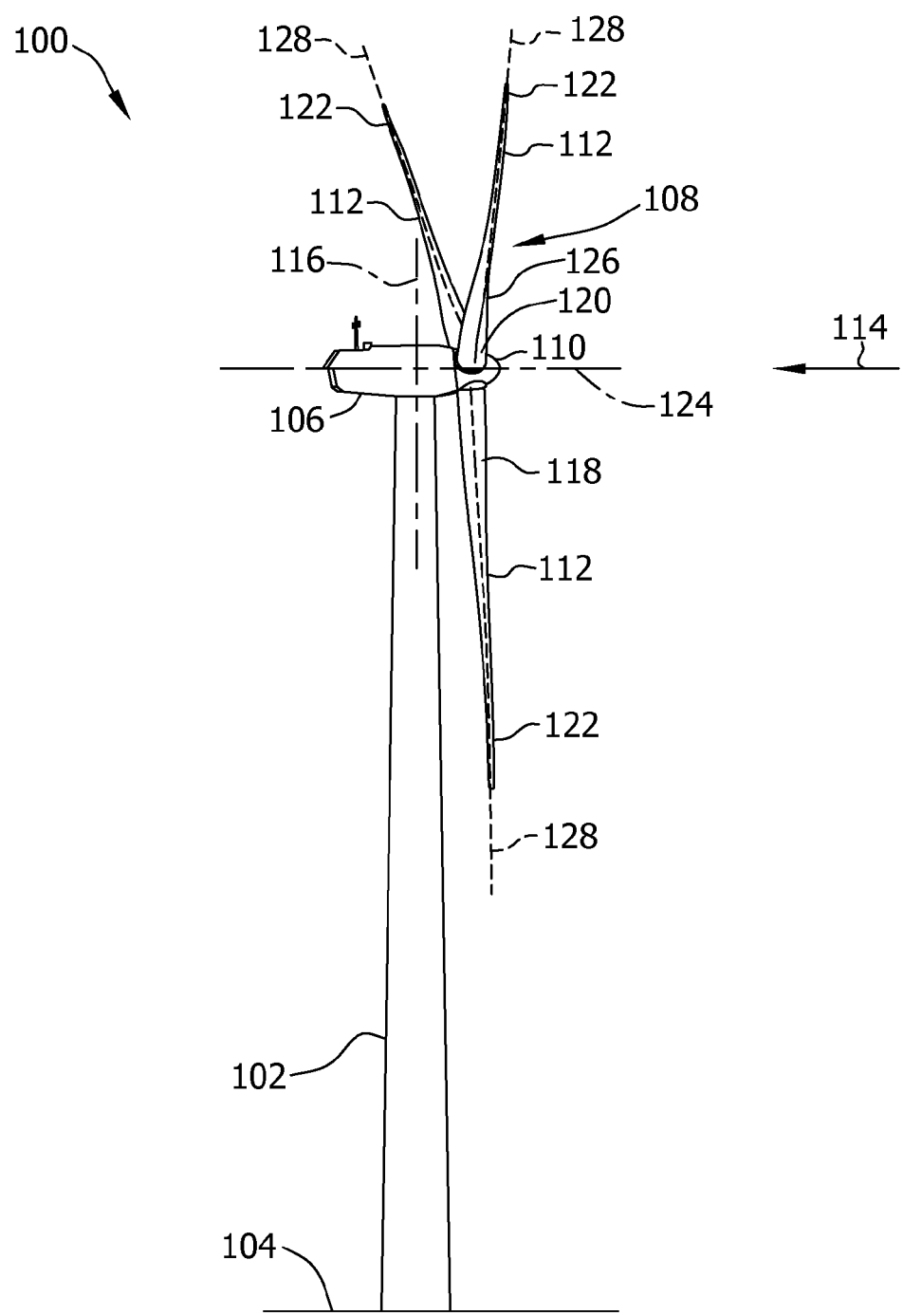
FIG. 1 is a perspective view of an exemplary wind turbine.

FIG. 1 is a schematic view of an exemplary wind turbine 100. In the exemplary embodiment, wind turbine 100 is a horizontal-axis wind turbine. Alternatively, wind turbine 100 may be a vertical-axis wind turbine. In the exemplary embodiment, wind turbine 100 includes a tower 102 extending from and coupled to a supporting surface 104. Tower 102 may be coupled to surface 104 with anchor bolts or via a foundation mounting piece (neither shown), for example. A nacelle 106 is coupled to tower 102, and a rotor 108 is coupled to nacelle 106. Rotor 108 includes a rotatable hub 110 and a plurality of rotor blades 112 coupled to hub 110. In the exemplary embodiment, rotor 108 includes three rotor blades 112. Alternatively, rotor 108 may have any suitable number of rotor blades 112 that enables wind turbine 100 to function as described herein. Tower 102 may have any suitable height and/or construction that enables wind turbine 100 to function as described herein.

Rotor blades 112 are spaced about hub 110 to facilitate rotating rotor 108, thereby transferring kinetic energy from wind 114 into usable mechanical energy, and subsequently, electrical energy. Rotor 108 and nacelle 106 are rotated about tower 102 on a yaw axis 116 to control a perspective of rotor blades 112 with respect to a direction of wind 114. Rotor blades 112 are mated to hub 110 by coupling a rotor blade root portion 118 to hub 110 at a plurality of load transfer regions 120. Load transfer regions 120 each have a hub load transfer region and a rotor blade load transfer region (both not shown in FIG. 1). Loads induced to rotor blades 112 are transferred to hub 110 via load transfer regions 120. Each rotor blade 112 also includes a rotor blade tip portion 122.

In the exemplary embodiment, rotor blades 112 have a length of between approximately 30 meters (m) (99 feet (ft)) and approximately 120 m (394 ft). Alternatively, rotor blades 112 may have any suitable length that enables wind turbine 100 to function as described herein. For example, rotor blades 112 may have a suitable length less than 30 m or greater than 120 m. As wind 114 contacts rotor blade 112, lift forces are induced to rotor blade 112 and rotation of rotor 108 about an axis of rotation 124 is induced as rotor blade tip portion 122 is accelerated.

A pitch angle (not shown) of rotor blades 112, i.e., an angle that determines the perspective of rotor blade 112 with respect to the direction of wind 114, may be changed by a pitch assembly (not shown in FIG. 1). More specifically, increasing a pitch angle of rotor blade 112 decreases an amount of rotor blade surface area 126 exposed to wind 114 and, conversely, decreasing a pitch angle of rotor blade 112 increases an amount of rotor blade surface area 126 exposed to wind 114. The pitch angles of rotor blades 112 are adjusted about a pitch axis 128 at each rotor blade 112. In the exemplary embodiment, the pitch angles of rotor blades 112 are controlled individually.

Figure 2:
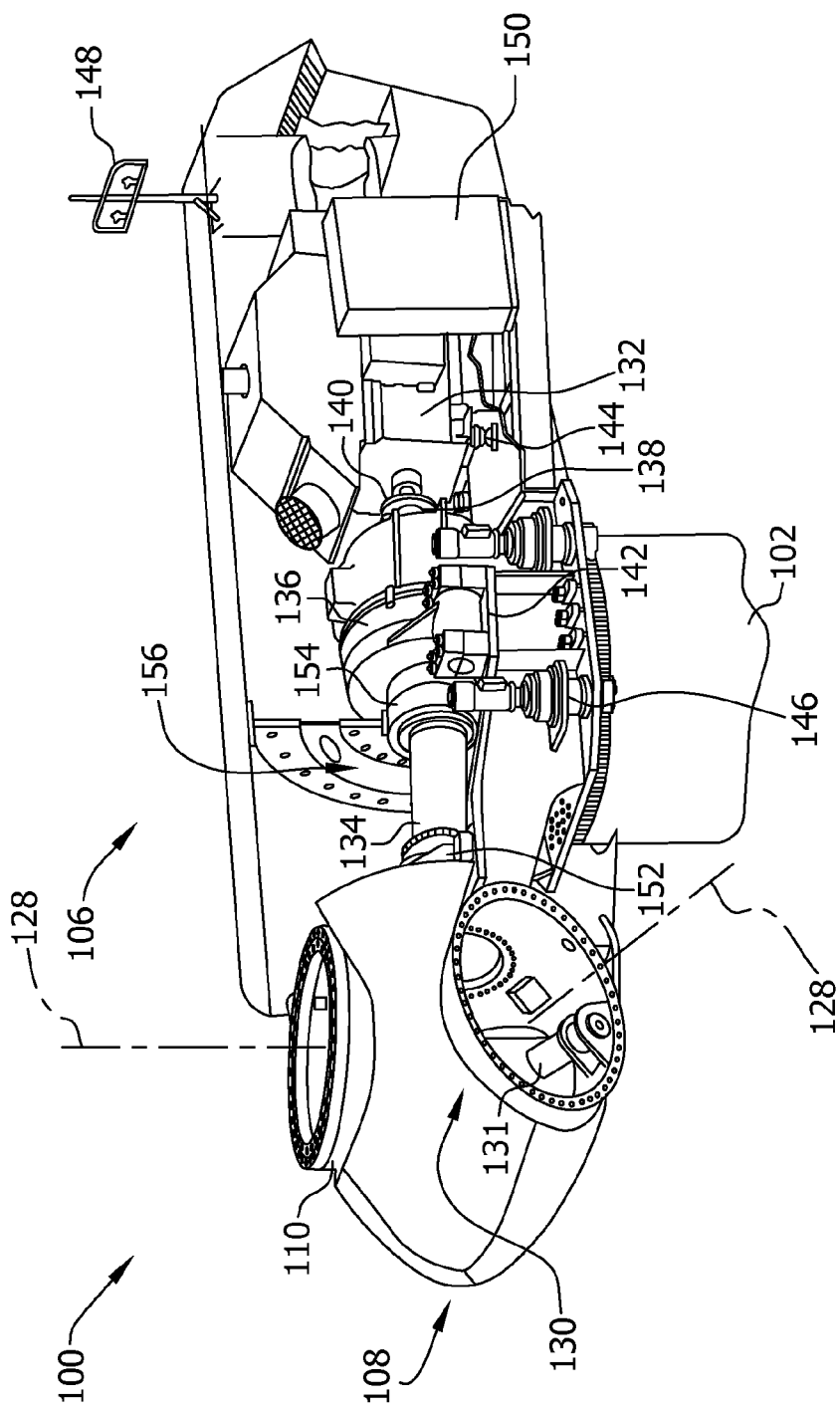
FIG. 2 is a partial sectional view of an exemplary nacelle suitable for use with the wind turbine shown in FIG. 1.

FIG. 2 is a partial sectional view of nacelle 106 of exemplary wind turbine 100 (shown in FIG. 1). Various components of wind turbine 100 are housed in nacelle 106. In the exemplary embodiment, nacelle 106 includes three pitch assemblies 130. Each pitch assembly 130 is coupled to an associated rotor blade 112 (shown in FIG. 1), and modulates a pitch of an associated rotor blade 112 about pitch axis 128. Only one of three pitch assemblies 130 is shown in FIG. 2. In the exemplary embodiment, each pitch assembly 130 includes at least one pitch drive motor 131.

As shown in FIG. 2, rotor 108 is rotatably coupled to an electric generator 132 positioned within nacelle 106 via a rotor shaft 134 (sometimes referred to as either a main shaft or a low speed shaft), a gearbox 136, a high speed shaft 138, and a coupling 140. Rotation of rotor shaft 134 rotatably drives gearbox 136 that subsequently drives high speed shaft 138. High speed shaft 138 rotatably drives generator 132 via coupling 140 and rotation of high speed shaft 138 facilitates production of electrical power by generator 132. Gearbox 136 is supported by a support 142 and generator 132 is supported by a support 144. In the exemplary embodiment, gearbox 136 utilizes a dual path geometry to drive high speed shaft 138. Alternatively, rotor shaft 134 is coupled directly to generator 132 via coupling 140.

Nacelle 106 also includes a yaw drive mechanism 146 that rotates nacelle 106 and rotor 108 about yaw axis 116 (shown in FIG. 1) to control the perspective of rotor blades 112 with respect to the direction of wind 114. Nacelle 106 also includes at least one meteorological mast 148 that includes a wind vane and anemometer (neither shown in FIG. 2). In one embodiment, meteorological mast 148 provides information, including wind direction and/or wind speed, to a turbine control system 150. Turbine control system 150 includes one or more controllers or other processors configured to execute control algorithms. As used herein, the term "processor" includes any programmable system including systems and microcontrollers, reduced instruction set circuits (RISC), application specific integrated circuits (ASIC), programmable logic circuits (PLC), and any other circuit capable of executing the functions described herein. The above examples are exemplary only, and thus are not intended to limit in any way the definition and/or meaning of the term processor. Moreover, turbine control system 150 may execute a SCADA (Supervisory, Control and Data Acquisition) program.

Pitch assembly 130 is operatively coupled to turbine control system 150. In the exemplary embodiment, nacelle 106 also includes forward support bearing 152 and aft support bearing 154. Forward support bearing 152 and aft support bearing 154 facilitate radial support and alignment of rotor shaft 134. Forward support bearing 152 is coupled to rotor shaft 134 near hub 110. Aft support bearing 154 is positioned on rotor shaft 134 near gearbox 136 and/or generator 132. Nacelle 106 may include any number of support bearings that enable wind turbine 100 to function as disclosed herein. Rotor shaft 134, generator 132, gearbox 136, high speed shaft 138, coupling 140, and any associated fastening, support, and/or securing device including, but not limited to, support 142, support 144, forward support bearing 152, and aft support bearing 154, are sometimes referred to as a drive train 156.

Figure 3:
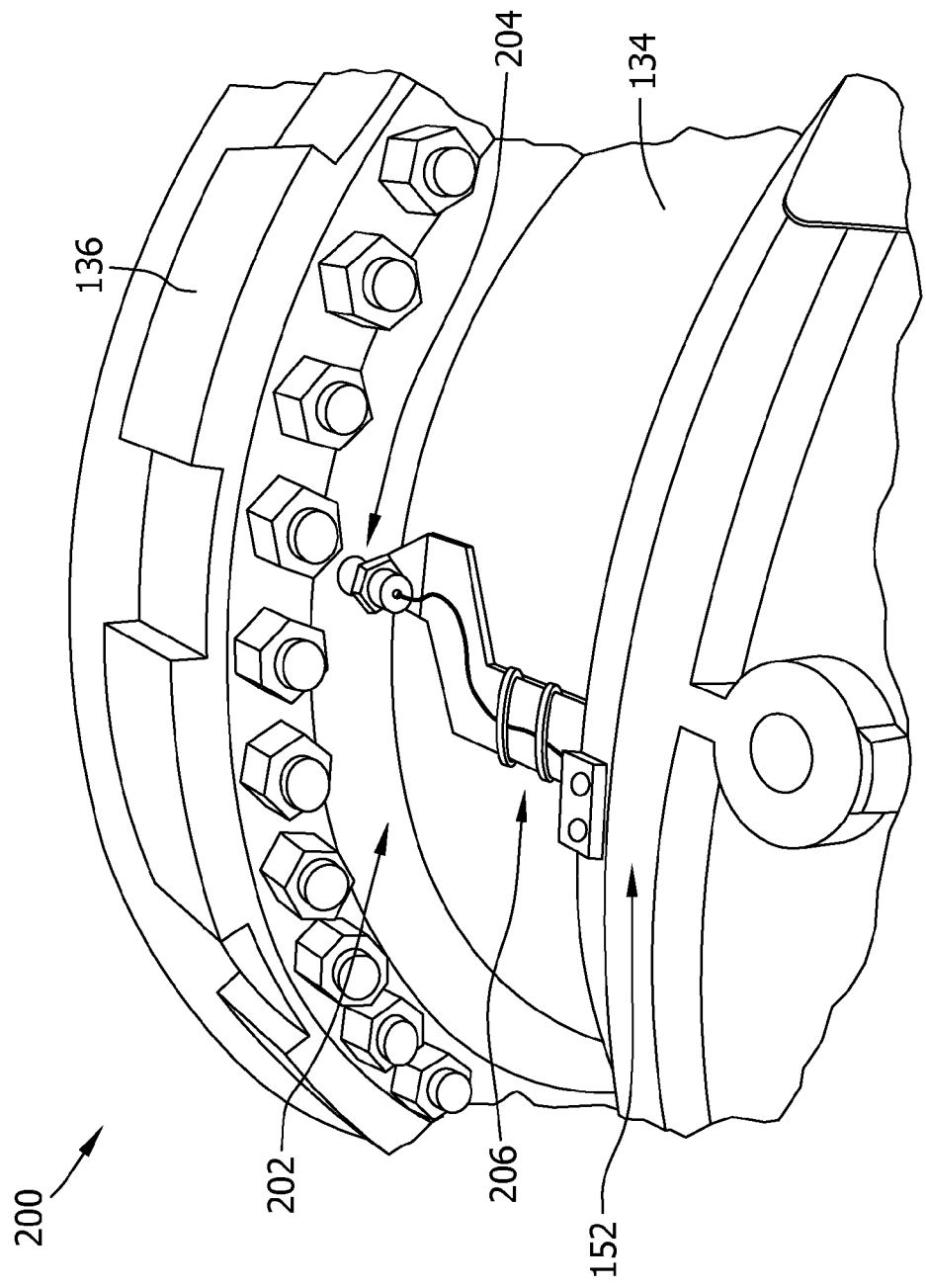
FIG. 3 is a perspective view of an exemplary sensor system suitable for use with the wind turbine shown in FIG. 1.

FIG. 3 is a perspective view of a sensor system 200 suitable for use in detecting asymmetric loading on one or more components of wind turbine 100 (shown in FIG. 1). Generally, asymmetric loading occurs as a result of vertical and horizontal wind shears, yaw misalignment, and turbulence. Asymmetric loads acting on rotor blades 112 translate into moments acting on rotor 108, hub 110, and subsequently rotor shaft 134. These moments are manifested as deflections or strains at a rotor shaft flange 202. Sensors 204, such as proximity sensors, are utilized to measure a displacement of rotor shaft flange 202. In some configurations, each sensor 204 is mounted on a sensor bracket 206 that is coupled to forward support bearing 152. Sensor readings from sensors 204 indicating measured displacements and/or moments are used by a control system, such as turbine control system 150 and/or a load control system (not shown in FIG. 3), to determine a pitch command for each rotor blade 112 to reduce or counter asymmetric rotor loading and to determine a favorable yaw orientation to reduce pitch activity. In some configurations, four sensors 204 with 90 degree spacing are used to measure displacement of rotor shaft flange 202 resulting from asymmetric loads. Moreover, in some configurations, sensors 204 are proximity sensors that measure rotor shaft flange 202 displacement relative to a non-deflecting reference frame, for example, forward support bearing 152.

Figure 4:
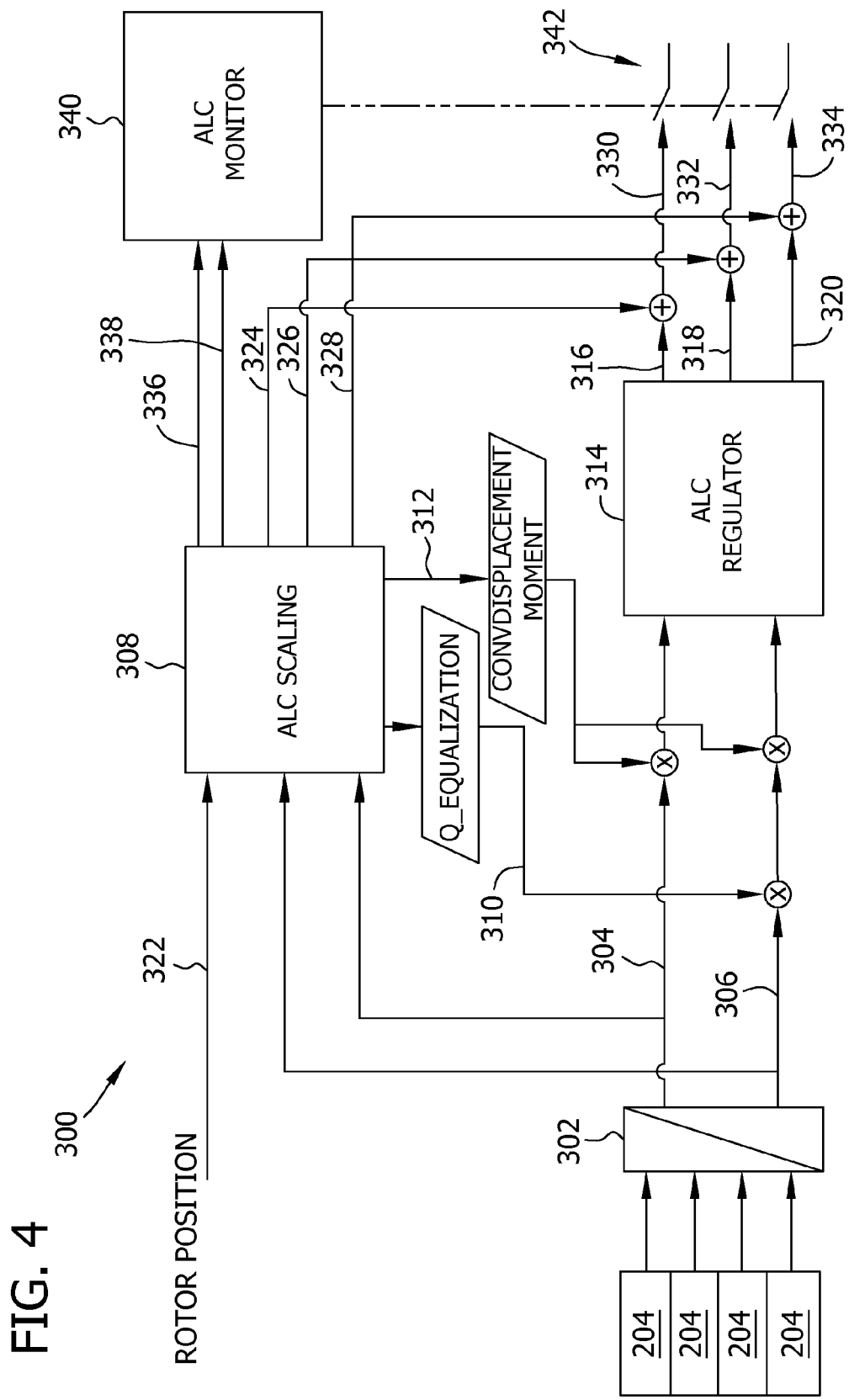
FIG. 4 is a schematic diagram of an exemplary load control system suitable for use with the wind turbine shown in FIG. 1.

FIG. 4 is a schematic view of an exemplary load control system 300 suitable for use with wind turbine 100 (shown in FIG. 1). In the exemplary embodiment, load control system 300 is at least partially implemented by and/or embodied within turbine control system 150 (shown in FIG. 2). Load control system 300 measures and/or reduces asymmetric loads induced to rotor 108, rotor shaft 134, and/or to other wind turbine components. Moreover, load control system 300 validates an installation and/or an operation of at least one wind turbine component. More specifically, in the exemplary embodiment, load control system 300 validates an installation or wiring order of rotor blades 112 within a rotor blade control cabinet (not shown) (hereinafter referred to as "rotor blade order") and/or a rotor position measurement. The rotor position measurement refers to a measurement from a suitable sensor (not shown) that identifies an angular or rotational position of rotor 108 with respect to a fixed, or non-rotating, reference frame.

In the exemplary embodiment, load control system 300 includes four sensors 204 that are spaced approximately 90 degrees apart from each other about rotor shaft 134 and/or forward support bearing 152. Sensors 204 measure a displacement of rotor shaft flange 202 due to loads induced to rotor 108. Sensors 204 transmit one or more signals representative of the moments (i.e., the measured load imbalances) or the measured displacement of rotor shaft flange 202 to a conversion module 302. Conversion module 302 converts the signals from a rotational frame of reference to a fixed frame of reference. The converted signals are transmitted as a D component 304 and a Q component 306 of the moment signals. As used herein, D component 304 and Q component 306 represent load components in a D direction and in a Q direction of the fixed reference frame. Conversion module 302 transmits D component 304 and Q component 306 to a calibration module 308. Q component 306 is multiplied by an equalization factor signal 310, and the calibrated Q component 306 and D component 304 are multiplied by a conversion factor signal 312 to normalize the signals. The normalized signals are transmitted to a load regulator module 314. Load regulator module 314 adjusts a pitch angle of one or more rotor blades 112 based on the normalized signals to balance the loading on rotor 108. More specifically, load regulator module 314 transmits a first pitch angle signal 316 to adjust a pitch angle of a first rotor blade 112, a second pitch angle signal 318 to adjust a pitch angle of a second rotor blade 112, and a third pitch angle signal 320 to adjust a pitch angle of a third rotor blade 112.

Calibration module 308 receives D component 304 and Q component 306 of the moment signal and a rotor position signal 322 transmitted by a rotor position sensor (not shown). Calibration module 308 generates equalization factor signal 310 and conversion factor signal 312. Equalization factor signal 310 is used to normalize D component 304 and Q component 306 to account for different mechanical elasticities which may exist in the D and Q load directions of one or more components of a rotor support structure (not shown), such as forward support bearing 152, aft support bearing 154, tower 102, a bed frame (not shown), and/or any other suitable component. Conversion factor signal 312 is used to convert D component 304 and Q component 306 to a suitable unit of measurement for load regulator module 314. Moreover, calibration module 308 generates one or more signals representative of a scaling or calibration factor for rotor blade 112 pitch angles. More specifically, in the exemplary embodiment, calibration module 308 generates a first calibration factor signal 324, a second calibration factor signal 326, and a third calibration factor signal 328. In one embodiment, first calibration factor signal 324, second calibration factor signal 326, and third calibration factor signal 328 may be averaged together to generate a single calibration factor signal (not shown). Alternatively, first calibration factor signal 324, second calibration factor signal 326, and third calibration factor signal 328 may each be applied separately to a respective rotor blade 112.

In one embodiment, first calibration factor signal 324 is added to first pitch angle signal 316 to generate a first pitch control signal 330, second calibration factor signal 326 is added to second pitch angle signal 318 to generate a second pitch control signal 332, and third calibration factor signal 328 is added to third pitch angle signal 320 to generate a third pitch control signal 334. First pitch control signal 330, second pitch control signal 332, and third pitch control signal 334 are each transmitted to respective pitch assemblies 130 (shown in FIG. 2) to control a pitch angle of respective rotor blades 112. In the exemplary embodiment, calibration module 308 also verifies rotor position signal 322 and the rotor blade order, as is more fully described herein. If an error is detected, calibration module 308 transmits a rotor position error signal 336 and/or a rotor blade order error signal 338 to a load monitor module 340.

In the exemplary embodiment, load monitor module 340 controls whether load control system 300 is coupled to pitch assemblies 130. More specifically, load monitor module 340 couples load control system 300 to pitch assemblies 130 via a plurality of switches 342 if rotor position error signal 336 and/or rotor blade order error signal 338 are acceptable or are within an acceptable range. If rotor position error signal 336 and/or rotor blade order error signal 338 are not acceptable or are not within an acceptable range, load monitor module 340 decouples load control system 300 from pitch assemblies 130 via switches 342. If load control system 300 is coupled to pitch assemblies 130, first pitch control signal 330, second pitch control signal 332, and third pitch control signal 334 are transmitted to pitch assemblies 130 to control the pitch angles of each rotor blade 112. As such, the loading on rotor 108 may be adjusted and/or balanced by load control system 300. In an alternative embodiment, calibration module 308 uses a suitable algorithm to correct rotor position errors and/or rotor blade order errors, rather than operating switches 342 and/or transmitting rotor position error signal 336 and rotor blade order error signal.

FIG. 5 is a flow diagram of an exemplary method 400 of validating a wind turbine, such as wind turbine 100 (shown in FIG. 1). In the exemplary embodiment, method 400 is at least partially executed by turbine control system 150 (shown in FIG. 2) and/or by load control system 300 (shown in FIG. 4). Alternatively, method 400 is executed by any suitable control system within wind turbine 100 and/or remote from wind turbine 100.

In the exemplary embodiment, a loading test is started or resumed 402. Turbine control system 150 and/or load control system 300 sets 404 at least one rotor blade pitch angle to a first value or set of values to intentionally induce an aerodynamic loading imbalance to at least one wind turbine component, such as rotor 108. In other words, turbine control system 150 and/or load control system 300 changes a pitch angle of at least one rotor blade 112. The pitch angle of a first rotor blade 112 is different from a pitch angle of at least one other rotor blade 112 such that a loading imbalance is intentionally induced to at least one wind turbine component. In the exemplary embodiment, a first rotor blade 112 is pitched to a "power" position, i.e., to a position that is directed towards the wind such that more power is extracted by first rotor blade 112. A second rotor blade 112 and a third rotor blade 112 are each pitched to a "feather" position, i.e., to a position that is directed away from the wind such that substantially less power is extracted by second rotor blade 112 and third rotor blade 112. In an alternative embodiment, rotor blades 112 are pitched to pitch angles of between about 0.5 degrees and about 1.5 degrees with respect to a "zero" or reference angle. Moreover, the pitch angles for rotor blades 112 are chosen to create suitable loading imbalances within rotor 108 in a variety of directions and with opposite polarities to create a differential measurement of a load imbalance orientation aligned with each rotor blade pitch axis 128 (shown in FIG. 1). Alternatively, rotor blades 112 may be pitched to any suitable position that enables a measurable loading imbalance to be induced to rotor 108.

After rotor blades 112 have been pitched to the first set of pitch angle values, a loading on at least one wind turbine component is measured 406. In the exemplary embodiment, a loading on rotor 108 is measured 406 by at least one suitable sensor, such as by one or more sensors 204 (shown in FIG. 3). While rotor blades 112 are positioned at the first set of pitch angle values, method 400 determines whether a fault or undesired wind condition has occurred 408. If a fault or undesired wind condition has occurred 408, the loading test is interrupted 410 until the fault has been corrected or removed or the wind condition has changed. Once the fault has been corrected or removed or the wind condition has changed, method 400 starts or resumes 402 the loading test.

Once a predefined time has elapsed 412, method 400 determines whether the loading test has finished 414. In one embodiment, the predefined time is between about five minutes and about ten minutes. Alternatively, the predefined time is any suitable amount of time that enables method 400 to operate as described herein. In the exemplary embodiment, the loading test is repeated 416 a predefined or suitable number of times, with each repetition of the loading test including different sets of predefined values for rotor blade pitch angles. In one embodiment, the loading test is repeated 416 six times, with different combinations of rotor blade 112 pitch angles induced to rotor blades 112 at each test repetition. For example, during a second repetition of the loading test, first rotor blade 112 and third rotor blade 112 may be pitched to a power position, while second rotor blade 112 is pitched to a feather position. During a third repetition of the loading test, first rotor blade 112 and second rotor blade 112 may be pitched to a feather position, while third rotor blade 112 is pitched to a power position. Additional test repetitions may include different combinations of rotor blade pitch angles. Alternatively, in each repetition of the loading test, each rotor blade 112 may be pitched to any suitable position that enables a measurable loading imbalance to be induced to rotor 108.

Once the loading test is finished 414, data from the loading test is processed 418. The data may include, for example, one or more values of D component 304 and/or Q component 306 of the moment signals, rotor position signal 322 (all shown in FIG. 4), and/or any other suitable signal or data. In one embodiment, the loading test data is processed 418 during or after each repetition of the loading test has completed. In such an embodiment, the data may be compiled and/or integrated while waiting for the predefined time to elapse 412. In the exemplary embodiment, the loading test data is processed 418 to extract and/or to calculate phases of the loading imbalances and/or magnitudes of the loading imbalances. In one embodiment, the test data is integrated into Fourier sums that are further processed 418 to determine the phases of the loading imbalances and/or magnitudes of the loading imbalances. Alternatively, any suitable frequency decomposition algorithm or process may be used to extract and/or to calculate the phases and/or magnitudes of the loading imbalances from the test data. After the test data has been processed 418, the rotor position measurements, i.e., rotor position signal 322 (shown in FIG. 3) and/or the rotor blade order are verified 420. More specifically, the phases of the loading imbalance calculated by the loading test are compared to expected phases of the loading imbalance for the tested pitch angles. A difference between the calculated phases and the expected phases that exceeds a predefined error threshold indicates that the rotor position measurement is not within an acceptable error range and/or that the rotor blade order is incorrect. Moreover, if the difference between the calculated phases and the expected phases exceeds the predefined error threshold, turbine control system 150 and/or calibration module 308 may generate one or more error signals and/or may automatically adjust a pitch angle and/or a calibration factor of one or more rotor blades 112 to correct and/or to substantially eliminate the difference.

The calculated or extracted magnitudes of the loading imbalances are used to calculate 422 at least one calibration factor for at least one wind turbine component. In the exemplary embodiment, the magnitudes of the loading imbalances are used to calculate 422 calibration factors of the pitch angles for rotor blades 112, such as first calibration factor signal 324, second calibration factor signal 326, and third calibration factor signal 328. More specifically, the calculated or extracted loading imbalance magnitude is divided by the calculated or extracted pitch angle imbalance (i.e., the imbalance or difference between rotor blade 112 pitch angles) to determine the calibration factor for each rotor blade pitch angle. As such, at least one wind turbine component, such as at least one rotor blade 112, may be calibrated by method 400 and/or by load control system 300.

In the exemplary embodiment, load control system 300 is coupled to a remote system, such as a wind farm control system. As such, load control system 300 and/or method 400 may be operated by the remote system without a need for a technician to be on-site. Moreover, existing wind turbines may be retrofitted or upgraded to use load control system 300 and/or method 400.

A technical effect of the systems and method described herein includes at least one of: (a) intentionally inducing a loading imbalance to a rotor; (b) measuring a loading imbalance induced to a rotor; (c) transmitting a signal representative of a measured loading imbalance to a calibration module; and (d) at least one of detecting an error and calibrating at least one component of a wind turbine.

Further technical effects of the systems and method described herein may include: (a) detecting a rotor position measurement error in a wind turbine; (b) detecting a rotor blade installation order error in a wind turbine; (c) automatically correcting at least one of a rotor position measurement error and a rotor blade installation order error; (d) balancing a loading induced to a rotor; and (e) calibrating at least one component of a wind turbine.

The above-described embodiments provide an efficient and cost-effective load control system for a wind turbine. The load control system induces aerodynamic loading imbalances to a rotor and measures the resulting moments caused by the imbalances. The load control system uses the measurements to detect a rotor position measurement error and/or an incorrect rotor blade order. The load control system also uses the measurements to calculate a calibration factor for the rotor blade pitch angles. As such, rotor errors may be detected and the rotor blades may be calibrated without expensive test equipment.

Exemplary embodiments of a wind turbine, a load control system, and a method of validating a wind turbine are described above in detail. The wind turbine, load control system, and method are not limited to the specific embodiments described herein, but rather, components of the wind turbine and/or load control system and/or steps of the method may be utilized independently and separately from other components and/or steps described herein. For example, the load control system may also be used in combination with other wind turbines and methods, and is not limited to practice with only the wind turbine and method as described herein. Rather, the exemplary embodiment can be implemented and utilized in connection with many other wind turbine applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of validating a wind turbine including a rotor, said method comprising:
   intentionally inducing a loading imbalance to the rotor;
   measuring the loading imbalance induced to the rotor;
   transmitting a signal representative of the measured loading imbalance to a calibration module;
   analyzing the signal by performing a frequency decomposition on the signal to calculate at least one of a magnitude of the loading imbalance and a phase of the loading imbalance; and,
   at least one of detecting an error and calibrating at least one component of the wind turbine based on the signal.

2. A method in accordance with claim 1, further comprising comparing the calculated phase of the loading imbalance with an expected phase of the loading imbalance to determine a rotor position measurement error.

3. A method in accordance with claim 1, further comprising comparing the calculated phase of the loading imbalance with an expected phase of the loading imbalance to determine a rotor blade installation order error.

4. A method in accordance with claim 1, further comprising comparing the calculated magnitude of the loading imbalance with an expected magnitude of the loading imbalance to calculate at least one a pitch angle calibration factor.

5. A method in accordance with claim 1, wherein the rotor includes a first rotor blade and a second rotor blade, said intentionally inducing a loading imbalance to the rotor comprises changing a pitch angle of the first rotor blade to induce a loading imbalance to the rotor, the pitch angle different from a pitch angle of the second rotor blade.

6. A method in accordance with claim 5, further comprising:
   waiting for a predefined time to elapse after changing the pitch angle of the first rotor blade; and,
   measuring the loading imbalance induced to the rotor during the elapsed predefined time.

7. A wind turbine, comprising:
   a rotor comprising at least two rotor blades; and,
   a load control system configured to adjust a pitch angle of at least one rotor blade of said two rotor blades, said load control system further configured to:
      intentionally induce a loading imbalance to said rotor;
      measure the loading imbalance induced to said rotor;
      transmit a signal representative of the measured loading imbalance to a calibration module;
      perform a frequency decomposition on the signal to calculate at least one of a magnitude of the loading imbalance and a phase of the loading imbalance; and
      at least one of detect an error and calibrate at least one component of said wind turbine based on the signal.

8. A wind turbine in accordance with claim 7, wherein said load control system is further configured to compare the calculated phase of the loading imbalance with an expected phase of the loading imbalance to determine a rotor position measurement error.

9. A wind turbine in accordance with claim 7, wherein said load control system is further configured to compare the calculated phase of the loading imbalance with an expected phase of the loading imbalance to determine a rotor blade installation order error.

10. A wind turbine in accordance with claim 7, wherein said load control system is further configured to divide the calculated magnitude of the loading imbalance by the calculated phase of the loading imbalance to calculate a pitch angle calibration factor.

11. A wind turbine in accordance with claim 7, wherein said load control system is configured to change a pitch angle of a first rotor blade of said two rotor blades to induce a loading imbalance to said rotor, the pitch angle of said first rotor blade different from a pitch angle of a second rotor blade of said two rotor blades.

12. A wind turbine in accordance with claim 11, wherein said load control system is further configured to:
   wait for a predefined time to elapse after changing the pitch angle of said first rotor blade; and,
   measure the loading imbalance induced to said rotor during the elapsed predefined time.

13. A load control system for a wind turbine that includes a rotor, said load control system configured to intentionally induce a loading imbalance to the rotor, said load control system comprising:
   at least one sensor configured to measure the loading imbalance within the rotor and to generate a signal representative of the measured loading imbalance; and,
   a calibration module configured to:
      receive the signal;
      perform a frequency decomposition on the signal to calculate at least one of a magnitude of the loading imbalance and a phase of the loading imbalance; and,
      at least one of detect an error and calibrate at least one component of the wind turbine based on the signal.

14. A load control system in accordance with claim 13, wherein said calibration module is further configured to compare the calculated phase of the loading imbalance with an expected phase of the loading imbalance to determine a rotor position measurement error.

15. A load control system in accordance with claim 13, wherein said calibration module is further configured to compare the calculated phase of the loading imbalance with an expected phase of the loading imbalance to determine a rotor blade installation order error.

16. A load control system in accordance with claim 13, wherein said calibration module is further configured to compare the calculated magnitude of the loading imbalance with an expected magnitude of the loading imbalance to calculate a pitch angle calibration factor.

17. A load control system in accordance with claim 13, wherein the rotor includes a rotor blade, and wherein a pitch angle of the rotor blade is changed to induce the loading imbalance, said load control system configured to:
   wait for a predefined time to elapse after the pitch angle of the rotor blade is changed; and,
   measure the loading imbalance during the elapsed predefined time.

* * * * *